(12) United States Patent
Wessling, Jr. et al.

(10) Patent No.: US 7,926,296 B2
(45) Date of Patent: Apr. 19, 2011

(54) PHASE CHANGE MATERIAL FOR TEMPERATURE CONTROL AND MATERIAL STORAGE

(75) Inventors: Francis C. Wessling, Jr., Huntsville, AL (US); James M. Blackwood, Huntsville, AL (US)

(73) Assignee: The Board of Trustees of the University of Alabama, Huntsville, AL (US)

( * ) Notice: Subject to any disclaimer, the term of this patent is extended or adjusted under 35 U.S.C. 154(b) by 1874 days.

(21) Appl. No.: 10/808,677

(22) Filed: Mar. 25, 2004

(65) Prior Publication Data

US 2005/0210890 A1    Sep. 29, 2005

(51) Int. Cl.
  *C09K 5/04*  (2006.01)
(52) U.S. Cl. .......................................... 62/114; 62/530
(58) Field of Classification Search ............... 62/530, 62/59, 114, 529; 252/71
  See application file for complete search history.

(56) References Cited

U.S. PATENT DOCUMENTS

| | | | |
|---|---|---|---|
| 3,981,977 A | 9/1976 | Mandel | 423/580 |
| 4,057,101 A | 11/1977 | Ruka et al. | 165/1 |
| 4,145,895 A | 3/1979 | Hjertstrand et al. | 62/529 |
| 4,191,125 A | 3/1980 | Johnson | 116/219 |
| 4,530,816 A | 7/1985 | Douglas-Hamilton | 422/1 |
| 5,111,768 A | 5/1992 | Larsson et al. | 116/216 |
| 5,954,968 A | 9/1999 | Patterson | 210/651 |
| 6,020,575 A | 2/2000 | Nagle et al. | 219/432 |
| 6,221,137 B1 | 4/2001 | King et al. | 106/31.29 |

*Primary Examiner* — Mohammad Ali
(74) *Attorney, Agent, or Firm* — Lanier Ford Shaver & Payne, P.C.; Jon E. Holland

(57) ABSTRACT

A phase change material comprising a mixture of water and deuterium oxide is described, wherein the mole fraction of deuterium oxide is selected so that the mixture has a selected phase change temperature within a range between 0° C. and 4° C. The mixture is placed in a container and used for passive storage and transport of biomaterials and other temperature sensitive materials. Gels, nucleating agents, freezing point depression materials and colorants may be added to enhance the characteristics of the mixture.

22 Claims, 3 Drawing Sheets

PHASE CHANGE MATERIAL FOR TEMPERATURE CONTROL AND MATERIAL STORAGE

STATEMENT REGARDING FEDERALLY SPONSORED RESEARCH OR DEVELOPMENT

The U.S. government has a paid-up license in this invention and the right in limited circumstances to require the patent owner to license others as provided for by the terms of NASA cooperative agreement no. NCC8-243.

CROSS REFERENCE

This application claims priority to U.S. Provisional Application No. 60/460,519 entitled, "Use of Phase Change Materials for Temperature Control" and filed on Apr. 4, 2003, which is incorporated herein by reference.

TECHNICAL FIELD

The present invention is generally related to phase change materials utilized for passive temperature control, and, more particularly, is related to mixtures of water with other materials.

BACKGROUND OF THE INVENTION

Containers for storage or transport of temperature sensitive materials, such as biomaterials, may use a phase change material ("PCM") to maintain a desired temperature for preserving the sensitive material. Water is one of the most used PCMs for many temperature control applications and is normally used to keep the temperature of an environment close to zero degrees Celsius (0° C.), the freezing or phase change temperature for water. However, certain biomaterials and other temperature sensitive materials are often damaged when stored close to 0° C. and therefore should be stored at temperatures somewhat greater than 0° C. and less than approximately 4° C. It is well known and understood that the addition of a material, such as salt, to water ($H_2O$), provides a mixture with a freezing temperature below 0° C. In general, the addition of a material to water usually depresses or lowers the mixture's phase change temperature.

Although there is a variation in the ranges of desirable temperatures for passive storage and transport, there is a particular need for temperature values from around 0° C. to about 4° C. For example, in transport of biomaterials such as proteins, vaccines, transplant organs, blood products, urine samples, and other similar materials values too close to 0° C. or greater than approximately 4° C. may cause degradation of the biomaterials.

When a PCM has a phase change temperature, the temperature where freezing occurs, near or less than 0° C. the PCM is generally not useful for providing passive temperature control for biomaterials requiring storage temperatures slightly greater than 0° C. Because water has an excellent heat of fusion, water is generally considered to be a prime component for a PCM mixture. It would be desirable to find a material that when added to water would result in a mixture that had an increased phase change temperature that was greater than 0° C. and had a heat of fusion value nearly equal to that of water. Further, it would be desirable if such a material was relatively inexpensive, readily available, and non-toxic. Another desirable attribute of such a material would be the attribute of easily forming a homogeneous mixture with water. It would also be desirable if the added material had other physical characteristics similar to water.

SUMMARY OF THE DISCLOSURE

Embodiments of the present disclosure provide a phase change material suitable for storage and transport of temperature sensitive material. In addition, the phase change material may be used for physical therapy as a replacement for ice.

Phase change material in accordance with an embodiment of the present disclosure has phase change temperatures ranging from greater than approximately 0° C. to less than approximately 4° C. The phase change material is comprised of water mixed with deuterium oxide. By providing a selected mole fraction of deuterium oxide, a desired phase change temperature within the above range is provided.

A method in accordance with an embodiment of the present disclosure provides a phase change material having a selected phase change temperature with a range between greater than approximately 0° C. and less than approximately 4° C. A mole fraction of deuterium oxide is selected and mixed with water to provide a selected phase change temperature. The mixture is cooled to a temperature that causes the mixture to freeze or turn to a solid. The solid phase of the mixture is then placed in close proximity to a temperature sensitive material in order to keep the material at a desired temperature, such that degradation of the temperature sensitive material is reduced.

Other embodiments and advantages of the present disclosure will be or become apparent to one with skill in the art upon examination of the following drawings and detailed description. It is intended that all such embodiments and advantages that are included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Although water, when in the solid phase known as ice, serves as a valuable phase change material (PCM) for many temperature control applications, the use of ice for temperature control of certain temperature sensitive materials is undesirable. For example, some temperature sensitive materials, such as biomaterials, are damaged at temperatures too close to 0° C. In a particular application for transporting certain proteins to a space station, a desirable transport temperature is approximately 2° C. Transport temperatures below approximately 2° C. may cause damage to the proteins, and transport temperatures above approximately 2° C. may reduce the useful life of the proteins.

In a search for materials that have a desirable heat of fusion and have a freeze point of around 2° C., it was discovered that deuterium oxide ($D_2O$ or heavy water) has a phase change ("freeze") temperature of 3.8° C. A further examination of the properties of deuterium oxide indicated that it has desirable physical and environmental characteristics similar to water. For example, if a person were to drink a glass of deuterium oxide, the person would not be physically harmed. In addition, there is no evidence that non-radiated deuterium oxide water is environmentally hazardous to persons working in nuclear plants that use heavy water. Because deuterium oxide is used at nuclear power plants, in medical procedures and elsewhere, the techniques for extracting heavy water make it readily available at a reasonable cost. The inventors have determined that a mixture of deuterium oxide and water provide a useful and desirable PCM for passive control of temperatures within a selected range. Although naturally occurring water, found in lakes, rivers and streams, contains some deuterium oxide (around 0.015%) the amount is so small that it causes only a miniscule change in the phase change temperature of natural water. It is however important to note that water and deuterium oxide are miscible in all mixture portions thereby providing a homogeneous mixture.

Figure 1:
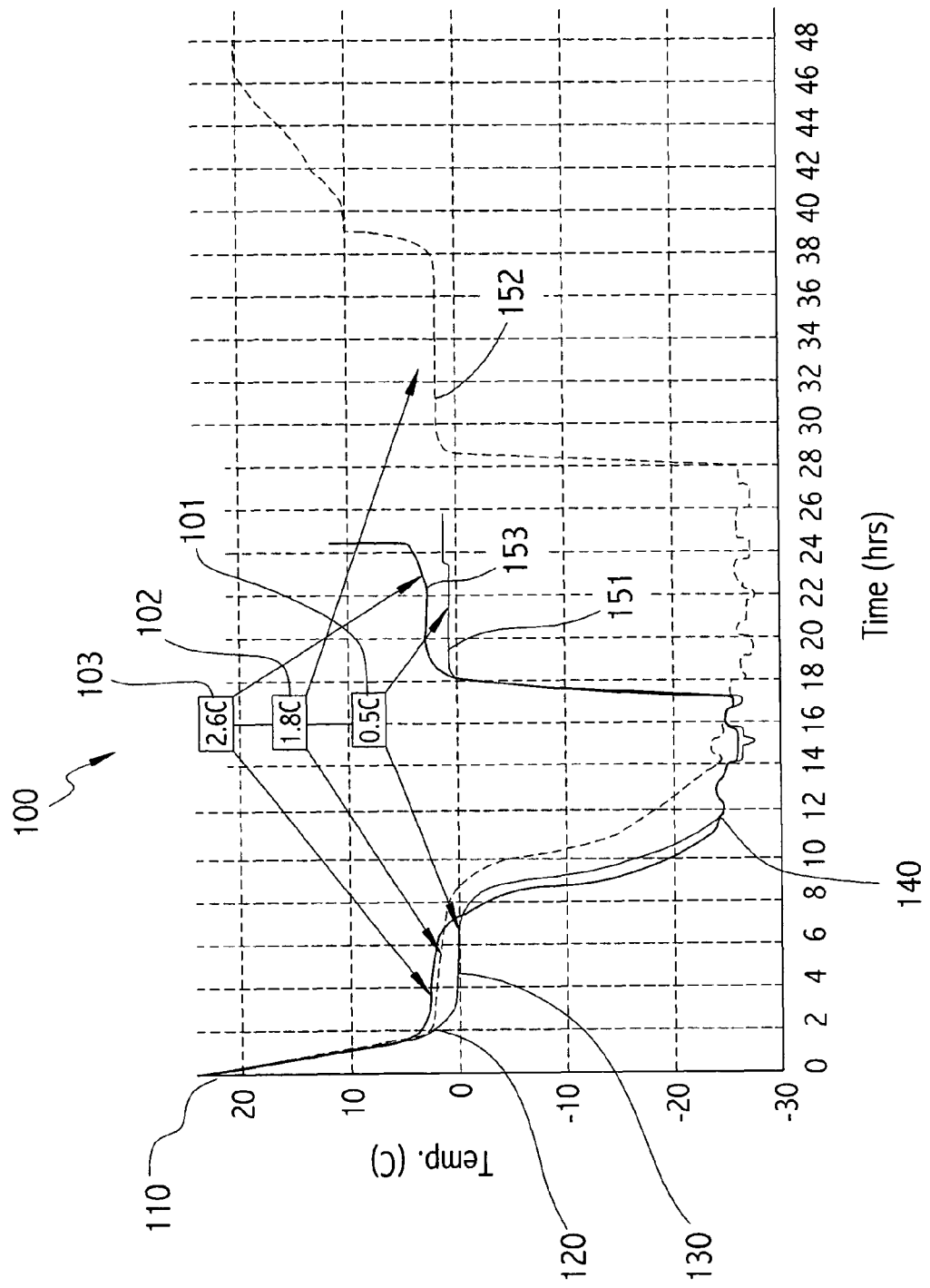
FIG. 1 illustrates phase transitions of mixtures of water and deuterium oxide.

The phase change characteristics 100 of three different mixtures of water and deuterium oxide are shown in FIG. 1. The three mixtures, experimentally determined to having phase change temperatures of 0.5° C., 1.8° C., and 2.6° C. go through temperature cycles as graphically illustrated.

In FIG. 1, curves 101-103 respectively represent the temperature cycles of the mixtures. In particular, curve 101 represents the temperature cycle of a mixture having a phase change temperature of 0.5° C. Further, curve 102 represents the temperature cycle of a mixture having a phase change temperature of 1.8° C. and curve 103 represents the temperature cycle of a mixture having a phase change temperature of 2.6° C. The three mixtures are combined at room temperature, shown as point 110 on the ordinate axis, and then placed in a freezer. The temperature of the mixtures decreases until the phase change (or freeze) temperature of each mixture is reached near the point 120 on the curves. Between a period from around 2 to 8 hours, shown near the point 130 on the grid, each of the mixtures are a combination of solid and liquid as the heat of fusion is released by the mixtures. At around the time value of 8 hours all the mixtures are completely frozen, i.e., changed from the liquid phase to the solid phase, and the temperatures of the mixtures then drops to the temperature within the freezer of around −25° C. as illustrate by location 140 on the grid. The actual time to freeze is dependent on many variables, such as the physical configuration of a holding container (not shown), amount of PCM, the freezer configuration, and freezer temperature. When each of the mixtures is removed from the freezer, each mixture reaches its phase change temperature as indicated by the flat characteristics near points 151-153 of the characteristic curves 101-103. The graphical record of the experimental results is evidence that mixtures of water and deuterium oxide are useful PCMs in the temperature region between approximately 0° C. and 4° C.

Figure 2:
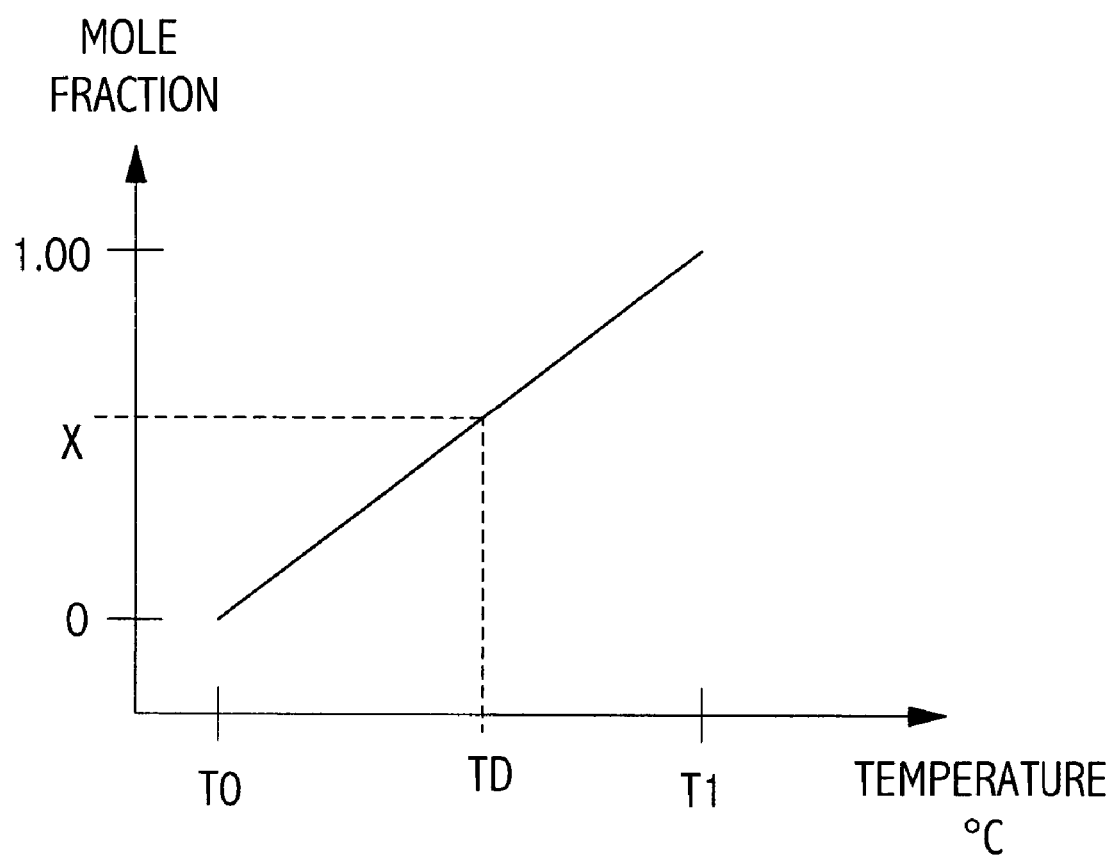
FIG. 2 illustrates a chart that may be used to select an approximate mixture for the phase change material of FIG. 1 to match a desired phase change temperature.

FIG. 2 graphically illustrates the relation between the mole fraction ("MLFR") of water and deuterium oxide mixtures to the phase change temperature of the mixtures. MLFR is defined as the ratio of: (the number of moles of deuterium) to (the number of moles of deuterium plus the number of moles of water). The temperatures on the abscissa, T0 and T1, represent respectively the freezing temperatures of water and deuterium oxide. Preferably, if a selected phase change temperature, TD, is desired, then the MLFR is preferably determined by selecting the corresponding value of X on the MOLE FRACTION axis. The graph may also be used to determine a phase change temperature corresponding to a given MLFR. The relation between a desired temperature, TD, and MLFR is given approximately by an equation, $TD = 3.8 * MLFR$, where TD is in degrees Celsius. The equation may be used instead of the graph of FIG. 2. The method of selecting the MLFR of the water and deuterium oxide mixture corresponding to a desired phase change temperature is not a limitation on the present invention.

The range of the phase change temperatures may be extended below 0° C. by adding a freezing point depression material such as salt. In some applications, it may be desirable to add colorants as a marker to identify the freeze temperature of the mixture. In other applications, it may be preferable to combine a mixture with cellulose, corn starch or other gel material. The particular gel material selected is not a limitation on the mixture. Because most of the physical properties of the mixture, formed by combining water and deuterium oxide, are similar to that of pure water, many of the applications, ways, and techniques that are used with water as a PCM may be extended for use with the mixture as a PCM.

Figure 3:
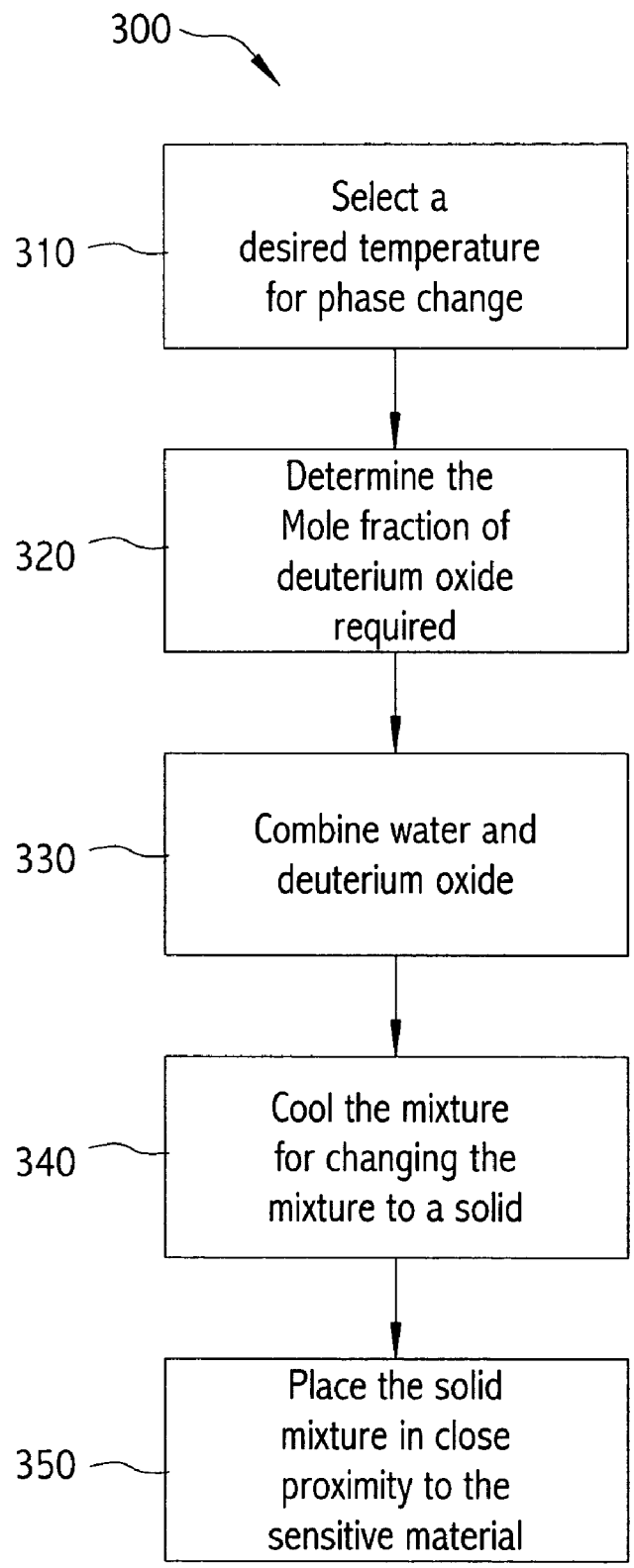
FIG. 3 illustrates an exemplary process for controlling a temperature of a sensitive material using the phase change material of FIG. 1.

Exemplary steps for providing and utilizing the PCM of the present invention are illustrated by the flow chart 300 of FIG. 3. When a selected storage temperature of a temperature sensitive material, such as a biomaterial, is known, then a desired temperature for phase change is chosen to be equal to the selected storage temperature, step 310. Next, the mole fraction of deuterium oxide that provides the desired phase change temperature is determined, step 320. Preferably, the desired temperature is located on the graph of FIG. 2 and the corresponding mole fraction is selected from the MOLE FRACTION axis. However, in other embodiments other techniques, such as using the aforedescribed equation, may be used to determine the desired mole fraction of deuterium oxide. In step 330 the water and deuterium oxide are combined to provide a mixture having the desired mole fraction of deuterium oxide. The mixture is then cooled to a temperature below the phase change temperature, step 340, preferably until the mixture is frozen. It should be noted that adding a nucleating agent to the mixture is often necessary in order to avoid supercooling the mixture. It is preferable that the mixture, now in a solid or frozen phase, be near the desired phase change temperature before it is placed near the temperature sensitive material. Step 350, is the step of placing the mixture in close proximity to the sensitive material so as to provide a desirable temperature controlled environment for the temperature sensitive material. Although the method described in the above steps illustrates a process for making and using a mixture for protecting sensitive materials from environmental temperatures above the selected phase change temperature, the mixture may also be utilized when environmental temperatures are below the phase change temperature. For example, if the temperature sensitive material is placed in a cold environment, where temperatures may be below 0° C., the mixture is preferably in a liquid phase. The mixture, in the liquid phase, preferably surrounds the sensitive material thereby protecting the sensitive material from temperatures below the desirable temperature.

In addition to the use of the mixture for storage and transport of sensitive materials, an invitro use of the mixture, there are invivo uses for the mixture. In physical therapy treatments, ice is used to reduce inflammation. However there is a chance of tissue damage if an ice pack, having a temperature of 0° C. or less is placed directly on the area of treatment. A treatment pack containing a mixture of water and deuterium oxide provides an improved treatment pack since the mixture provides treatment temperatures slightly above 0° C., such as 2° C., thereby eliminating or reducing the chance of tissue damage. Such treatment packs may be shaped and dimensioned to satisfy a desired treatment need by fitting about or conforming to a selected shape. Furthermore, the treatment pack containing the mixture could be frozen in a refrigerator (instead of a freezer), where the temperature is slightly above freezing, and the pack would never reach a temperature that may be harmful to living tissue.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A phase change material, comprising:
   a mixture of water and deuterium oxide wherein the mole fraction of deuterium oxide is selected to provide a desired phase change temperature in a range above zero degrees Celsius and below 3.8 degrees Celsius, wherein the mixture is positioned in close proximity to a biological material such that a temperature of the biological material is maintained near the desired phase change temperature.

2. The phase change material of claim 1 wherein a nucleating agent is added to the mixture.

3. The phase change material of claim 1 wherein a colorant is added to the mixture.

4. The phase change material of claim 1 wherein a gel material is added to the mixture.

5. The phase change material of claim 1 wherein a temperature depression material is added to the mixture.

6. The phase change material of claim 1 wherein the biological material comprises a protein.

7. The phase change material of claim 1 wherein the biological material comprises an organ.

8. The phase change material of claim 1 wherein the biological material comprises blood.

9. The phase change material of claim 1 wherein the biological material comprises urine samples.

10. The phase change material of claim 1 wherein the biological material comprises vaccines.

11. The phase change material of claim 1 wherein the biological material comprises living tissue.

12. A method, comprising the steps of:
   providing a container;
   positioning a biological material within the container; and
   placing a phase change material in close proximity to the biological material such that a temperature of the biological material is maintained near a phase change temperature of the phase change material, the phase change material composed of a mixture of water and deuterium oxide such that the phase change temperature is above zero degrees Celsius and below 3.8 degrees Celsius.

13. A method, comprising the steps of:
   mixing water and deuterium oxide thereby forming a mixture, wherein the mole fraction of deuterium oxide is selected so the mixture has a desired phase change temperature in a range above zero degrees Celsius and below 3.8 degrees Celsius; and
   placing the mixture close to a biological material so that a temperature of the biological material is maintained at the desired phase change temperature.

14. The method of claim 13 wherein the biological material and mixture are thermally isolated from the environment.

15. A treatment pack for use in physical therapy in order to maintain live tissue within a desired temperature range, comprising:
   a pack for holding phase change material; and
   a mixture of water and deuterium oxide having a selected mole fraction of deuterium oxide for a desired phase change temperature in a range above zero degrees Celsius and below 3.8 degrees Celsius, wherein the mixture is placed within the pack.

16. The treatment pack of claim 15 wherein the pack is shaped to conform for a desired treatment.

17. The treatment pack of claim 15 wherein a colorant is added to the mixture.

18. The treatment pack of claim 15 wherein a gel is added to the mixture.

19. A material that changes phase at a desired temperature between approximately zero degrees Celsius and four degrees Celsius comprising:
   water; and
   deuterium oxide wherein a mole fraction of deuterium oxide is chosen so that the phase change temperature of the material is the desired temperature,
   wherein the mole fraction is chosen according to the approximate equation, desired temperature=3.8* mole fraction of deuterium oxide.

20. The material of claim 19 wherein the material is used in a treatment pack.

21. A material that changes phase at a desired temperature between approximately zero degrees Celsius and four degrees Celsius comprising:
   water; and
   deuterium oxide wherein a mole fraction of deuterium oxide is chosen so that the phase change temperature of the material is the desired temperature,
   wherein the material, when in a solid phase, is crushed and serves as a slurry for surrounding a temperature sensitive material.

22. A method comprising the steps of:
   providing water;
   selecting an amount of deuterium oxide to be mixed with the water such that a mixture composed of the selected amount of deuterium oxide and the water has a phase change temperature close to a desired temperature in a range above zero degrees Celsius and below 3.8 degrees Celsius; and
   mixing the water and the selected amount of deuterium oxide thereby forming a phase change material; and
   positioning the phase change material close to a biological material such that a temperature of the biological material is controlled by the phase change material.

* * * * *